US011619169B2

(12) United States Patent
Weicker et al.

(10) Patent No.: US 11,619,169 B2
(45) Date of Patent: Apr. 4, 2023

(54) AIR-OIL HEAT EXCHANGER

(71) Applicant: SAFRAN AERO BOOSTERS SA, Herstal (BE)

(72) Inventors: David Weicker, Herstal (BE); Roel Vleugels, Herstal (BE); Nicolas Fellin, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 615 days.

(21) Appl. No.: 16/723,715

(22) Filed: Dec. 20, 2019

(65) Prior Publication Data

US 2020/0200088 A1    Jun. 25, 2020

(30) Foreign Application Priority Data

Dec. 24, 2018 (BE) .................................. 2018/5939

(51) Int. Cl.
*F02C 7/18* (2006.01)
*F02C 7/14* (2006.01)
(Continued)

(52) U.S. Cl.
CPC ................ *F02C 7/18* (2013.01); *B33Y 80/00* (2014.12); *F02C 7/14* (2013.01); *F28D 1/0246* (2013.01); *F28F 7/02* (2013.01); *B33Y 10/00* (2014.12); *F01D 25/12* (2013.01); *F02C 3/04* (2013.01); *F02C 9/18* (2013.01); *F05D 2220/323* (2013.01); *F05D 2240/12* (2013.01); *F05D 2240/30* (2013.01); *F05D 2260/202* (2013.01);
(Continued)

(58) Field of Classification Search
CPC ......... B33Y 10/00; B33Y 80/00; F01D 25/12; F02C 3/04; F02C 7/14; F02C 7/18; F02C 9/18; F05D 2220/323; F05D 2230/31; F05D 2240/12; F05D 2240/30; F05D 2250/73; F05D 2260/202; F05D 2260/213; F05D 2260/22141; F05D 2300/6032; F28F 13/08; F28F 7/02; F28D 1/0246; Y02T 50/60
See application file for complete search history.

(56) References Cited

U.S. PATENT DOCUMENTS 5,544,700 A  *  8/1996  Shagoury ................. F02C 7/14
                                                                    165/161
6,106,229 A  *  8/2000  Nikkanen ................ F02C 7/14
                                                                    415/176
(Continued)

FOREIGN PATENT DOCUMENTS

EP        3012436 A1    4/2016
EP        3012443 A1    4/2016
(Continued)

OTHER PUBLICATIONS

Search Report dated Sep. 3, 2019 for BE 201805939.

*Primary Examiner* — Jesse S Bogue
(74) *Attorney, Agent, or Firm* — James E. Walton

(57) ABSTRACT

A matrix for exchanging heat between a first fluid and a second fluid, in particular for an air-oil application in a turbine engine, includes an envelope defining a flow path of the first fluid and a network extending into the flow path and in which the second fluid flows. Along the axis defined by the curvature of the matrix, the dimensions of the envelope vary circumferentially (T(A)) and radially (R(A)). The matrix may be used with a heat exchanger.

15 Claims, 3 Drawing Sheets

(51) Int. Cl.
*B33Y 80/00* (2015.01)
*F28D 1/02* (2006.01)
*F28F 7/02* (2006.01)
*B33Y 10/00* (2015.01)
*F01D 25/12* (2006.01)
*F02C 3/04* (2006.01)
*F02C 9/18* (2006.01)

(52) U.S. Cl.
CPC .............. *F05D 2260/213* (2013.01); *F05D 2260/22141* (2013.01); *F05D 2300/6032* (2013.01)

(56) References Cited

U.S. PATENT DOCUMENTS

| | | | |
|---|---|---|---|
| 9,903,661 B2 * | 2/2018 | Odillard | F28D 9/0043 |
| 2007/0175617 A1 * | 8/2007 | Brost | F28F 9/0075 |
| | | | 165/149 |
| 2012/0114468 A1 * | 5/2012 | Elder | F02C 7/14 |
| | | | 415/178 |
| 2014/0231054 A1 * | 8/2014 | Martins | F28F 9/001 |
| | | | 165/166 |
| 2015/0377135 A1 * | 12/2015 | Kupiszewski | F01D 25/12 |
| | | | 165/51 |
| 2016/0003148 A1 * | 1/2016 | Gameiro | F02C 7/224 |
| | | | 415/177 |
| 2016/0031566 A1 * | 2/2016 | Ribarov | B01D 35/18 |
| | | | 210/336 |
| 2016/0108813 A1 * | 4/2016 | Schmitz | F02C 7/14 |
| | | | 60/39.511 |
| 2016/0108815 A1 * | 4/2016 | Schmitz | F28D 1/0476 |
| | | | 29/890.03 |
| 2017/0284750 A1 * | 10/2017 | Ueda | F28F 1/24 |
| 2018/0058306 A1 * | 3/2018 | Oh | F28F 9/0075 |
| 2020/0263561 A1 * | 8/2020 | Cleyet | F01D 25/08 |
| 2020/0284517 A1 * | 9/2020 | Becene | F28D 1/0472 |
| 2021/0270534 A1 * | 9/2021 | Erno | F28F 21/089 |

FOREIGN PATENT DOCUMENTS

| | | | | |
|---|---|---|---|---|
| FR | 3003024 A1 * | 9/2014 | | F02C 7/14 |
| WO | 2012001759 A1 | 1/2012 | | |
| WO | WO-2016063497 A1 * | 4/2016 | | F02C 7/18 |
| WO | 2018065304 A1 | 4/2018 | | |

\* cited by examiner

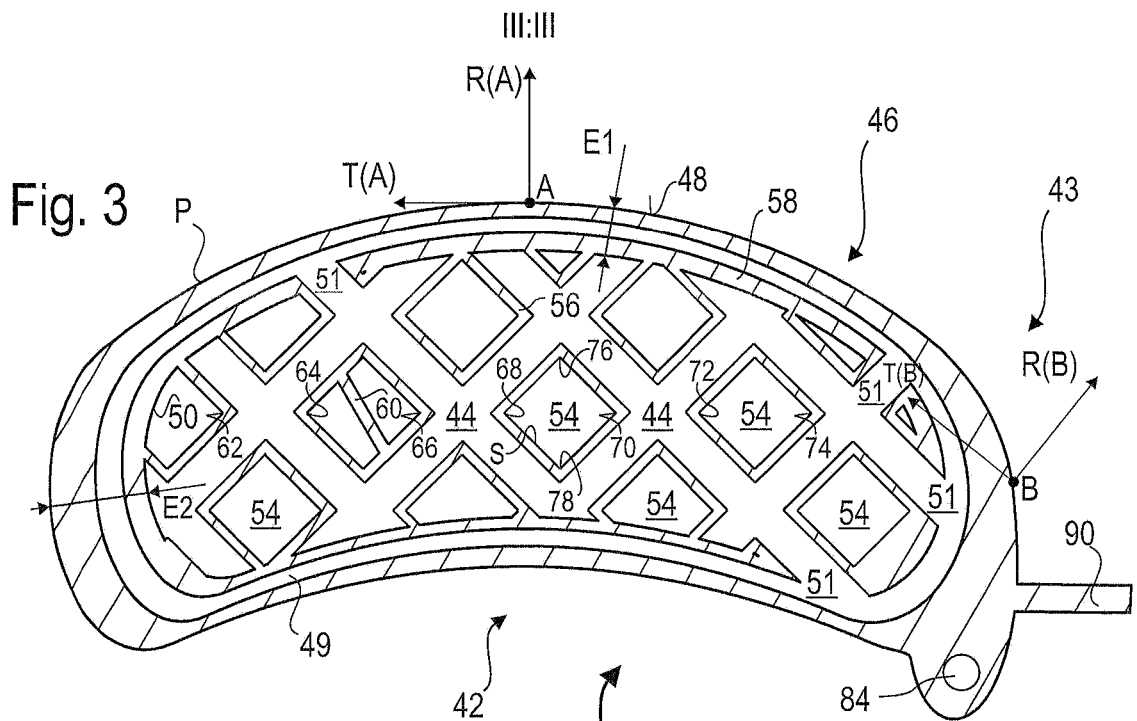
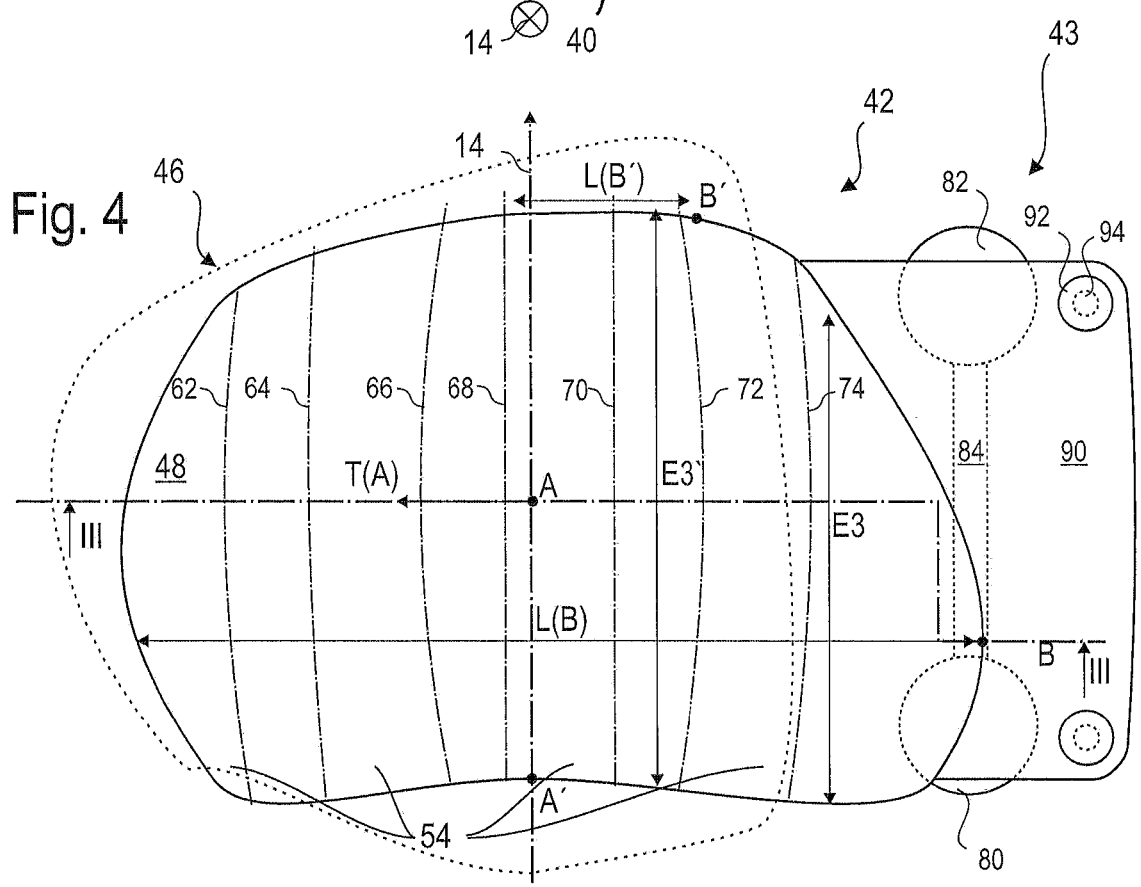

AIR-OIL HEAT EXCHANGER

This application claims priority under 35 U.S.C. § 119 to Belgium Patent Application No. 2018/5939, filed 24 Dec. 2018, titled "Air-Oil Heat Exchanger," which is incorporated herein by reference for all purposes.

BACKGROUND

1. Field of the Application

The present application relates to the field of turbine engine heat exchangers. More specifically, the present application proposes a turbine engine air/oil heat exchanger.

2. Description of Related Art

The document US 2016/0108815 A1 discloses an air/oil exchanger for an aircraft. This exchanger comprises a body of substantially arcuate shape and provided with a plurality of cooling fins arranged in a plurality of radial stages. Between two successive radial stages of fins are arranged circumferential passages for the oil.

Such a heat exchanger generates significant turbulences in the air flow.

Although great strides have been made in the area of turbomachine heat exchangers, many shortcomings remain.

DESCRIPTION OF THE DRAWINGS

FIG. 3 shows a cross-section of the exchanger in the plane III:III defined in FIG. 4;

FIG. 4 shows a radial top view of the exchanger;

DETAILED DESCRIPTION OF THE PREFERRED EMBODIMENT

Figure 1:
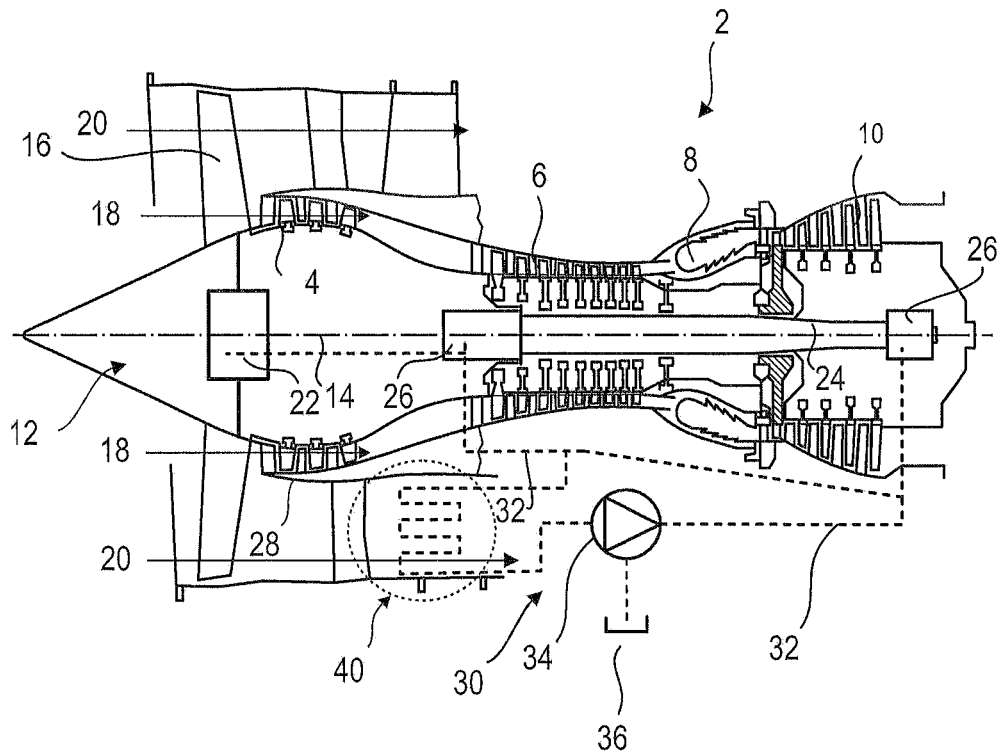
FIG. 1 shows represents an axial turbomachine/turbine engine.

The present application aims to provide a heat exchanger that minimizes the aerodynamic losses in the air flow induced by the presence of the exchanger but also to reduce the aerodynamic losses inside the exchanger itself. The present application also aims to optimize the efficiency of the exchange of heat. The present application also aims to provide a simple and compact solution.

The subject-matter of the present application is a matrix for a heat exchanger, the matrix comprising: an envelope with an inner surface spatially delimiting a flow path for the flow of a first fluid, and an outer surface; the envelope being of generally arcuate shape defining an axial direction which is the main flow direction of the first fluid, and a radial direction and a circumferential direction; the outer surface defining an outer outline of the matrix, as seen in a plane perpendicular to the main direction; and a network extending in the bushing and in which the second fluid flows; wherein in the axial direction, the outer outline varies radially and circumferentially.

The radial direction and the circumferential direction are both perpendicular to the axial direction at all points.

The variations of the outline result in the fact that the outer outline of the envelope in a given plane perpendicular to the axial direction is different from the outer outline in another plane, parallel to the given plane.

Another possible definition of the variations of the outer outline radially and circumferentially may be the following: any point on the outer surface which travels axially along the surface while maintaining its circumferential coordinate will have a radial coordinate that varies; and any point on the outer surface that travels axially along the surface while maintaining its radial coordinate will have a circumferential coordinate that varies.

When defining the outer outline with curves, these outline variations result in: any curve resulting from the intersection of the external surface with a radial plane (plane containing the axis) shows radial variations and any curve resulting from the intersection of the outer surface with a cylinder (having the same axis as defined by the curvature of the envelope) shows circumferential variations.

According to preferred embodiments of the present application, the matrix may comprise one or more of the following characteristics, according to any possible combination:

- the outline is enlarged radially and circumferentially in the upstream part of the matrix. For example, the outline may expand radially and circumferentially in an upstream portion. Said upstream portion can extend over at least 5, 10, 20 or 30% of the axial length of the matrix;
- the outline shrinks radially and circumferentially in the downstream part of the matrix. For example, the outline may shrink radially and circumferentially in a downstream portion. Said downstream portion can extend over at least 5, 10, 20 or 30% of the axial length of the matrix;
- the thickness of the envelope varies axially, circumferentially and radially. The thickness is, at any point of the outline, the shortest distance between the inner surface and the outer surface of the envelope. For a given outline (given axial position), the thickness can vary all around the outline. In a view seen parallel to the axis, the thickness can vary (radially increase or decrease, circumferentially increase or decrease). Finally, the axial dimension, i.e. the distance travelled by the air between the inlet into the matrix and its outlet, can vary circumferentially and radially;
- the network divides the flow path into a plurality of corridors, each corridor having, in a plane perpendicular to the axial direction, a section which varies axially. In other words, the cross-section of the corridor is not the same in two different planes perpendicular to the axis;
- the sections of the corridors and the external outline vary according to a common trend. Thus, when the outer envelope is growing, the corridors can expand also, and in the same proportions. Alternatively, the corridors can evolve inversely with the trend of the envelope: the thickness of the network can evolve to narrow the corridors when the envelope expands;
- the envelope and the network are integrally made by additive manufacturing;
- the network is an interweaving of tubing forming the corridors delimiting a homogeneous or heterogeneous plurality of regular or irregular geometrical shapes in the flow path. For example, corridors of polygonal (diamond, pentagon, etc.) or elliptical shape can be provided. The tubing within the network may have internal rectangular cross-sections and/or may have an aerodynamically shaped external outline (a leading edge and a trailing edge, pressure side and suction side), for example to minimize the pressure drop or to help the lift of the aircraft;

the tubing may be in accordance with the teachings of document WO 2018/065304 A1. For example, successively inclined cooling fins can be positioned in the corridors so that the air follows a helical path.

The matrix according to the present application can be adapted to perform additional functions in addition to the heat exchange between the two fluids. For example, housings may be provided to receive heating elements such as heating rods or electrical resistances, and/or heating films to heat the first and/or the second fluid when they have a temperature below an operating threshold, for example 20° C. Also, a passage network can be arranged in the matrix for a third fluid flowing transversely to the first and second fluid.

The present application also relates to a heat exchanger provided with such a matrix, the exchanger having an inlet manifold and an outlet manifold for the second fluid, the manifolds being integral with the matrix, and the manifolds being both arranged circumferentially on the same side of the matrix.

According to preferred embodiments of the present application, the heat exchanger can comprise one or more of the following features, according to any possible combination:
- a bypass connecting the inlet manifold to the outlet manifold, the bypass being integral with the matrix. The bypass allows the second fluid to not travel through the tubing network of the matrix. For this purpose, a shutter or a valve can close the network and open the bypass. The valve can be of any kind and for example thermostatic or controlled by detecting insufficient pressure in the oil circuit (for example PRV for Pressure Relief Valve). Thus, when the oil has a temperature below a determined threshold, it passes into the bypass because it is not useful to cool it in the heat exchanger and/or the oil is not fluid enough to go through the network (risk of clogging). The threshold can be for example 20° C.;
- the bypass conveys the flow of the second fluid in a substantially axial direction. Indeed, as the manifolds can be arranged on the same side of the matrix, the bypass can be compact and simple design;
- fastening flanges integral with the matrix. These flanges can be made in particular of substantially flat legs, having extra thicknesses receiving assembly elements (for example threaded);
- the bypass, the manifolds and at least one fixing flange may be arranged circumferentially on the same side of the matrix. This simplifies the assembly of the exchanger because all external connections to the matrix can be made in the same area of the exchanger: the fluid connections to the oil network, the mechanical attachment to the housing, the electrical connections for the control of the pass or flow control (pressures, flow rates, temperatures, received from sensors judiciously placed);
- a protective grid upstream of the flow path, the grid being integral with the matrix. Such a grid makes it possible to protect the matrix of foreign elements (debris, frost);
- a braking chamber upstream of the network and optionally an acceleration chamber downstream of the network, the braking chamber and optionally the acceleration chamber being integral with the matrix. In order to increase heat exchange, the air flow is slowed down, for example by expanding the flow cross-section upstream of the matrix.

The present application makes it possible to increase the efficiency of the heat exchange while limiting the pressure losses in the air flow. In the Context of a turbojet oil cooler, this solution becomes particularly relevant since the cold source is at very low temperature and is available in large quantities (outside air).

In the following description, the terms "internal" and "external" refer to a positioning relative to the axis of rotation of an axial turbomachine. The axial direction corresponds to the direction along the axis of rotation of the turbomachine. The radial direction is perpendicular to the axis of rotation. Upstream and downstream are in reference to the main flow direction of the air flow in the turbomachine.

FIG. 1 is a simplified representation of an axial turbojet engine 2. The turbojet engine 2 comprises a first, low-pressure compressor 4 and a second, high-pressure compressor 6, a combustion chamber 8 and one or more turbines 10. In operation, the mechanical power of the turbine 10 transmitted to the rotor 12 sets in motion the two compressors 4 and 6. The latter comprise several rows of rotor blades associated with rows of stator vanes. The rotation of the rotor about its axis of rotation 14 thus makes it possible to generate an air flow and to compress it progressively until it reaches the combustion chamber 8.

A fan 16 is coupled to the rotor 12 and generates a stream of air that splits into a primary stream 18 and a secondary stream 20 passing through an annular duct (partially shown) along the engine to then join the primary stream out of turbine.

A reduction gear 22 can reduce the speed of rotation of the fan and/or the low-pressure compressor relative to the associated turbine. The secondary flow can be accelerated so as to generate a thrust reaction necessary for the flight of an aircraft.

The rotor 12 comprises a transmission shaft 24 mounted on a casing by means of two bearings 26.

A housing surface 28 radially delimits the secondary flow 20 inwardly.

In order to lubricate the rotating elements of the turbojet engine 2, a lubrication circuit 30 is provided. This circuit 30 comprises ducts 32 for conveying the oil to the turbojet engine members 2 requiring it, such as in particular the gearbox 22 and the bearings 26. The circuit 30 comprises for this purpose a pump 34 for propulsion of the oil in the circuit 30 and a reservoir 36.

A heat exchanger 40 is provided to regulate the temperature of the oil in the circuit 30. The exchanger 40 can be positioned in the secondary flow 20 to cool the oil by means of the cold air of the secondary flow. A preferred but non-limiting area provided for the implantation of the heat exchanger is shown in dashed lines in FIG. 1. The heat exchanger may be in contact with and conform to the shape of the casing 28. It may be partially embedded into the casing 28. Alternatively, or in addition, the exchanger 40 may also be provided downstream of the bleed valves, to heat the fluids with hot air. The advantageous features of the exchanger may be useful for exchanging heat between other fluids of the turbomachine and in other places.

The circuit 30 includes all the organs for controlling the temperature, the pressure and the flow rate of the oil to obtain optimum operation (sensors, valves, booster, flow reducer, etc.).

The reservoir 36 can be attached to the nacelle of the turbine engine 2, or to a compressor casing. The reservoir 36 can be positioned between two annular walls guiding concentric flows; for example between the secondary flow 20 and the flow surrounding the turbomachine 2, or between the primary flow 18 and the secondary flow 20.

Figure 2:
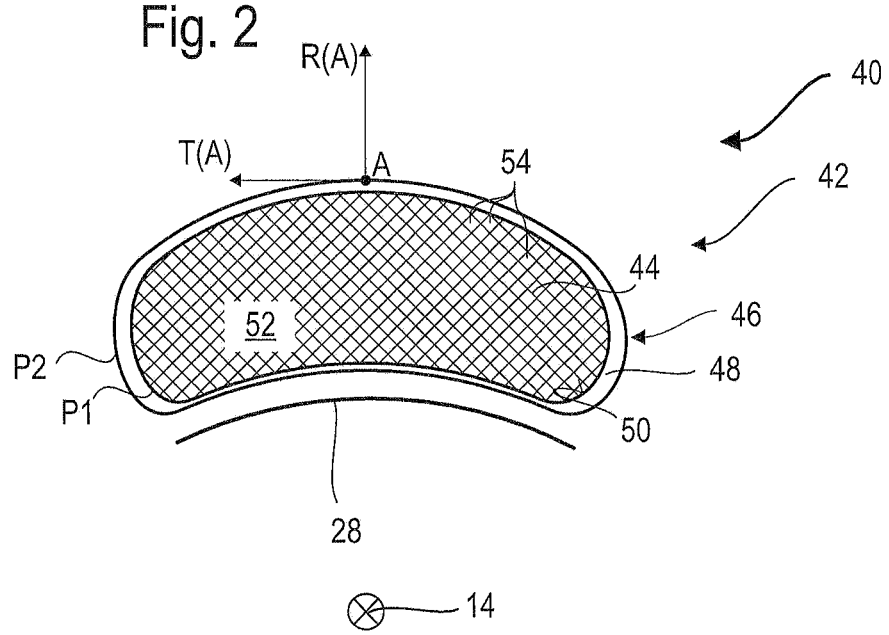
FIG. 2 illustrates a plan view of an exchanger according to the present application.

FIG. 2 shows a plan view of a heat exchanger 40 such as the one shown in FIG. 1, seen in a plane perpendicular to the axis 14 of the turbomachine 2. The heat exchanger 40 has a generally arcuate shape. It substantially matches an annular casing 28 of the turbomachine. It is crossed by the air of the secondary flow which forms a first fluid, and receives oil forming a second fluid. It has a matrix 42.

The matrix 42 comprises a network 44 and an envelope 46. The envelope 46 is delimited by an outer surface 48 and an inner surface 50. The inner surface 50 delimits a flow path 52 which the air of the secondary flow travels through the matrix 42. The outer surface 48 is in contact with the particles of air of the secondary flow which do not travel into the matrix 42.

The network 44 delimits a multitude of subdivisions of the flow path 48 in the form of corridors 54.

At any point in the matrix, the overall curvature of the matrix 42 and the axis 14 define a radial direction and a circumferential (or tangential) direction. Point A in FIG. 2 is an upper midpoint of the matrix. The radial direction at this point is denoted R (A) and the circumferential direction is denoted T (A).

The outer surface 48 is visible in this plan view because the envelope 46 has a dimension that varies along the axis 14. These variations are both circumferential and radial as we see the outer surface 48 on the left and right of the matrix in FIG. 2, as well as above and below.

The label P illustrates the external outline of the envelope in several axial positions. In FIG. 2, which is a plan view, P1 denotes the smallest outline, for example at the upstream level, where outer surface 48 and inner surface 50 meet. P2 is the largest outline.

FIG. 3 illustrates an enlarged section of the exchanger 40 and in particular of its matrix 42 in the plane perpendicular to the axis 14 and indicated III:III in FIG. 4. Only a few corridors 54 are shown and the dimensions are not to scale. In particular the thickness of the various walls and corridors 54 is exaggerated to facilitate understanding of the drawing.

In this example, the network 44 is a lattice or an interweaving of pipes traversed by the second fluid. Any type of tubing can be used in this matrix. Only an illustrative example is exposed here. The network 44 delimits the corridors 54. The section of the corridors 54 is denoted S. "Section" is to be understood here in the sense of a curve resulting from the intersection of a surface (the 3D surface of the corridors) and of a plan (that of FIG. 3). In the plane of FIG. 3, the section is a square or a diamond. In an upstream or downstream plane, the diamond may have dimensions that vary. For example, when the outline P expands in a given direction (for example radial), the corridors 54 may grow radially by an amount that is proportional to the enlargement of the envelope.

Conversely, the corridors 54 may have a behaviour contrary to that of the envelope.

The variations in the dimensions of the corridors make it possible in particular to reduce the aerodynamic losses that the air could undergo when it flows inside the matrix.

The section S of the corridors 54 can also vary in shape along the axis, passing from one form to another, for example from a diamond to a rectangular, square, even circular or oval, or vice versa.

The envelope 46 has a cavity 49 arranged between its outer surface 48 and its inner surface 50, the cavity 49 allowing the circulation of the second fluid.

The cavity 49 of the envelope 46 is fluidly connected to the network 44, at the junctions 51. At least two junctions 51 are provided for the input and the output of the second fluid in the network 44. The junctions 51 are appropriately positioned to facilitate the flow of the second fluid.

The entire network 44 and the envelope 46 are integrally made by an additive manufacturing process, such as ALM (additive layer manufacturing) from metal powder such as aluminium or titanium. The thickness of the layers may be between 10 microns and 150 microns, which makes it possible to achieve a minimum thickness for the inner walls of the matrix ranging from 0.40 mm to 0.8 mm. The walls of the envelope 46 may be thicker and be optimized so as not to be too heavy while still ensuring the required mechanical strength of the matrix.

The structure is self-supporting in the sense that tubing 44 is formed in the matrix without the need for strengthening arms or ribs.

The exchange of heat between the first and the second fluid takes place through the walls 56 and 58.

The thickness of the walls 56 and 58 may vary according to the three dimensions of the space. For example, as envelope 46 and lanes 54 grow, wall thickness may also increase. Alternatively, the thicknesses can vary independently of the variations of the envelope 46 or the corridors 54. Alternatively, the thicknesses of the walls 56 and 58 can be constant.

Fins 60 can be arranged in the corridors 54 to maximize the exchange surfaces between the fluids, for example fins successively inclined along the path of the first fluid, thus forming a helical channel in the corridors 54.

FIG. 3 illustrates the thickness of the envelope in two places, E1 and E2. These labels represent the distance between the outer surface 48 and the inner surface 50, measured at a given point and normally to the surfaces—or if the inner and outer surfaces do not share the same normal, normally at a mean direction to both normal. In the same way as for the walls 56 and 58, the thickness of the envelope E can vary for each point of the envelope, in the three directions of space, and especially along the axis 14.

FIG. 3 shows critical points 62, 64, 66, 68, 70, 72, 74 which here are ridges 54 placed at a substantially identical radial position. The points 76 and 78 are two edges of identical circumferential positions.

The cavity 49 allows the second fluid to flow on the one hand between an inlet manifold (denoted 80 in FIG. 4) and the network 44, and on the other hand between the network 44 and an outlet manifold (denoted 82 on FIG. 4). The inlet manifold 80 and outlet manifold 82 are preferably integrally formed with the matrix 42 and fluidly connected to the cavity 49 by appropriate passages. As can be seen in FIG. 4, the manifolds 80, 82 are advantageously positioned on the same circumferential side 43 of the matrix 42.

A bypass 84 connecting the manifolds 80, 82 to each other can be arranged in the matrix 42. This allows, under the action of shutters or valves (not shown), to shunt the network 44 and to convey the second fluid directly from the inlet manifold 80 to the outlet manifold 82.

With reference to FIGS. 3 and 4, it can be observed that on the same side 43 of the matrix 42 as the manifolds 80, 82, a fixing flange 90 can be provided with, for example, a bulge 92 receiving a thread 94. Another flange (not shown) can be arranged at another place in the matrix, for example on the side opposite the flange 90.

Finally, FIG. 3 shows the median point A as on FIG. 2, and a point B materializing the extreme circumferential point of the envelope.

FIG. 4 illustrates a plan view perpendicular to the direction R (A) of FIG. 3, viewed radially from the outside of the matrix 42.

This view illustrates the envelope 46 and in particular its axial dimension E3, which varies circumferentially (E3' is greater than E3). Likewise, this figure shows the variations of the circumferential width of the matrix L (L'>L).

The matrix may have any aerodynamic symmetric or asymmetric shape suitable for its integration in its implantation zone in the turbine engine. The implantation zone may include "obstacles" such as sensors, valves or conduits of various kinds and the matrix may be locally or globally deformed from its general curvature to avoid mechanical interference with these "obstacles".

It is observed that to allow better penetration of the air into the matrix, the envelope can be shaped as a wing (having an upstream leading edge, a downstream trailing edge, suction and pressure surfaces).

An alternative form for the edge envelope 46 is illustrated in dotted lines.

Point B materializes the axial position where the circumferential dimension is the greatest. Point B' illustrates the smallest circumferential dimension. The difference between the circumferential width of B and that of B' can be at least 10% (L(B)/L(B')>1.1). As illustrated, this ratio is close to 5.

Similarly, the point A' illustrates the upstream median position of the outer surface. The radial coordinates of A and A' may differ by at least 10% (R(A)/R(A')>1.1).

The critical points 62, 64, 66, 68, 70, 72, 74 are shown as dot-dash lines to illustrate the dimensions of the corridors 54 which are not linear or parallel to the axis 14. It is observed that in the illustrated example, the corridors 54 share the same trends (expand/retract) as the envelope 46.

FIG. 4 also illustrates the fastening flange 90 and the plane III:III of the section of the view of FIG. 3 as well as the manifolds 80, 82 and the bypass 84 as discussed above.

Figure 5:
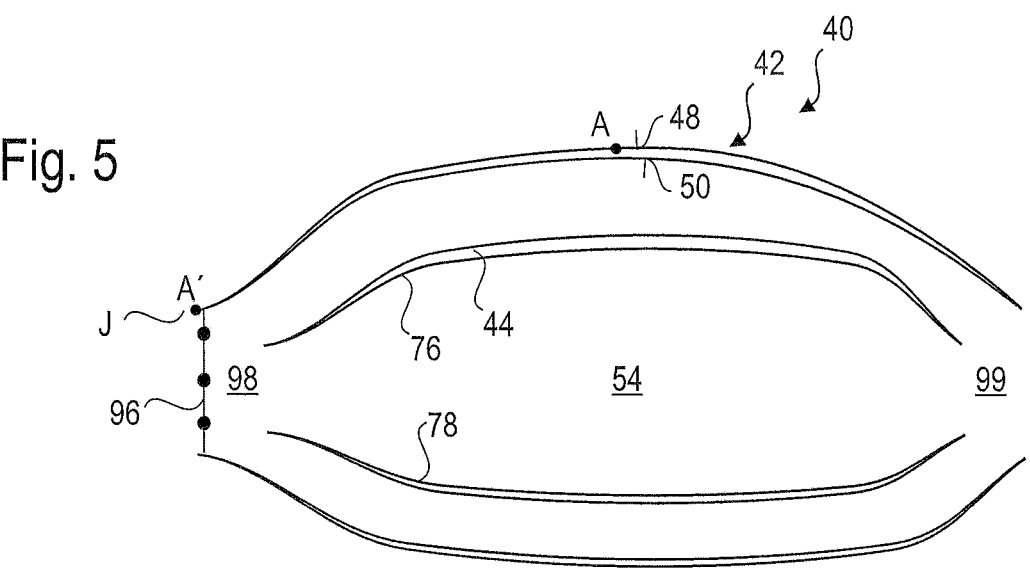
FIG. 5 illustrates the exchanger in a circumferential cross-section (or parallel to the axis).

FIG. 5 illustrates schematically in a plane parallel to the axis 14, an exchanger 40 as previously illustrated. The scales are not respected, to facilitate the understanding of the figure. In this view, there is a protective grid 96 for protecting the matrix 42 and in particular the network 44. This grid can be integrally made with the matrix 42.

A braking chamber 98 and an acceleration chamber 99 may be provided to slow down and then accelerate the flow of air. These chambers 98, 99 may take the form of a nozzle with an abruptly variable cross-section. These chambers 98, 99 are integrally made with the envelope 46 of the matrix 42.

FIG. 5 also shows the lines 76 and 78 identified in FIG. 3. It is observed that the (radial) height of the corridor 54 varies along the axis. In this case, the variations in height of the corridor 54 follow the trend of the variations of the envelope 46, that is to say an increase in a first axial half of the matrix, then a decrease.

If the variations of the envelope and the corridors are illustrated here as increasing and decreasing, from upstream to downstream, the skilled person will understand that various alternative embodiments are possible, in particular a decrease followed by a growth, or alternatively cyclic variations or more complex variations with inflection points.

Upstream and downstream of the matrix 42, the outer surface 48 and the inner surface 50 of the envelope meet. This joint can be arranged to minimize pressure drops, for example by a leading edge and a trailing edge similar to a blade or a wing. The letter J references the upstream join.

Similarly, the walls 56 of the network 44 meet upstream and downstream of the matrix and can have a leading edge and a trailing edge.

The matrix for heat exchanger according to the present application is intended to be integrated into an aircraft turbojet engine but is not limited thereto. The heat exchanger according to the present application is preferably intended to exchange heat between air and oil but is not limited to this use.

In the illustrated embodiments, the axis 14 of the exchanger is coincident with the axis of the turbine engine, but the present application is not limited to this design and the axis of the exchanger may be different from that of the turbine engine.

We claim:

1. A matrix for a heat exchanger, the matrix comprising:
   an envelope with an inner surface spatially delimiting a flow path for a first fluid and an outer surface, the envelope being generally arcuate in shape, defining an axial direction which is the main direction of flow of the first fluid, a radial direction from a central axis radially outward, and a circumferential direction, the outer surface defining an outer outline of the matrix, seen in a plane perpendicular to the main direction; and
   a network extending within the flow path and within which a second fluid flows;
   wherein in the axial direction, the outer outline varies radially and circumferentially, in the sense that any geometric point of the outer surface which travels axially along the outer surface while keeping unchanged its circumferential coordinate has a radial coordinate that varies, and any geometric point on the outer surface which travels axially along the outer surface while keeping unchanged its radial coordinate has a circumferential coordinate that varies.

2. The matrix according to claim 1, wherein the outer outline is expanded radially and circumferentially in an upstream portion of the matrix.

3. The matrix according to claim 1, wherein the outer outline converges radially and circumferentially in a downstream portion of the matrix.

4. The matrix according to claim 1, wherein the outer outline varies between a smallest radial height and a largest radial height that differ from one another by at least 10%, and the outer outline varies between a smallest circumferential width and a largest circumferential width that differ from one another by at least 10%.

5. The matrix according to claim 1, wherein the network subdivides the flow path into a plurality of corridors, each corridor having, in a plane perpendicular to the axial direction, a cross-section which varies axially.

6. The matrix according to claim 5, wherein the cross-sections of the corridors and of the outer outline both increase in an axially upstream half of the matrix and decrease in an axially downstream half of the matrix.

7. The matrix according to claim 1, wherein the envelope and the network are integrally made by additive manufacturing.

8. The matrix according to claim 1, wherein the network is an interweaving of tubing forming the corridors delimiting a homogeneous or heterogeneous plurality of regular or irregular geometrical shapes in the flow path.

9. The matrix according to claim 1, further comprising:
   an inlet manifold and an outlet manifold for the second fluid, the manifolds being integral with the matrix, and the manifolds being both arranged on a same circumferential side of the matrix.

10. The matrix according to claim 9, further comprising:
    a bypass connecting the inlet manifold to the outlet manifold, the bypass being integral with the matrix.

11. The matrix according to claim 10, wherein the bypass allows the flow of the second fluid in an axial direction.

12. The matrix according to claim 1, further comprising: fastening flanges integral with the matrix.

13. The matrix according to claim 10, further comprising: fastening flanges integral with the matrix;
wherein the bypass, the manifolds, and at least one fastening flange are arranged on the same circumferential side of the matrix.

14. The matrix according to claim 1, further comprising: a protective grid upstream of the flow path, the protective grid being integral with the matrix.

15. The matrix according to claim 1, further comprising: a braking chamber upstream of the network and an acceleration chamber downstream of the network, the braking chamber and the acceleration chamber being integral with the matrix.

\* \* \* \* \*